United States Patent
Yanagisawa (10) Patent No.: US 10,022,927 B2
(45) Date of Patent: Jul. 17, 2018

(54) METHOD OF MANUFACTURING OPTICAL WAVEGUIDE DEVICE AND LASER PROCESSING APPARATUS

(71) Applicant: SHINKO ELECTRIC INDUSTRIES CO., LTD., Nagano-shi, Nagano (JP)

(72) Inventor: Kenji Yanagisawa, Nagano (JP)

(73) Assignee: SHINKO ELECTRIC INDUSTRIES CO., LTD., Nagano-Shi (JP)

( * ) Notice: Subject to any disclaimer, the term of this patent is extended or adjusted under 35 U.S.C. 154(b) by 317 days.

(21) Appl. No.: 14/977,812

(22) Filed: Dec. 22, 2015

(65) Prior Publication Data

US 2016/0187582 A1 Jun. 30, 2016

(30) Foreign Application Priority Data

Dec. 26, 2014 (JP) ................. 2014-264324

(51) Int. Cl.
*B29D 11/00* (2006.01)
*G02B 6/138* (2006.01)
*G02B 6/122* (2006.01)
*G02B 6/12* (2006.01)
*G02B 6/42* (2006.01)
*G02B 6/43* (2006.01)

(52) U.S. Cl.
CPC ...... *B29D 11/00663* (2013.01); *G02B 6/1221* (2013.01); *G02B 6/138* (2013.01); *G02B 6/4214* (2013.01); *G02B 6/428* (2013.01); *G02B 6/43* (2013.01); *G02B 2006/1219* (2013.01); *G02B 2006/12069* (2013.01); *G02B 2006/12147* (2013.01); *G02B 2006/12173* (2013.01)

(58) Field of Classification Search
CPC .... G02B 6/138; G02B 6/4214; G02B 6/1221; B29D 11/00663
See application file for complete search history.

(56) References Cited

U.S. PATENT DOCUMENTS

2003/0152756 A1* 8/2003 Yamada ................. B23K 26/18
428/210
2010/0323297 A1* 12/2010 Yanagisawa ............. G02B 6/43
430/315

FOREIGN PATENT DOCUMENTS

| JP | 06-003539 | 1/1994 |
| JP | 2000-117465 | 4/2000 |
| JP | 2012-013819 | 1/2012 |
| JP | 2015-087724 | 5/2015 |

OTHER PUBLICATIONS

Japanese Office Action dated Feb. 23, 2018, English translation included, 6 pages.

* cited by examiner

*Primary Examiner* — Mathieu Vargot
(74) *Attorney, Agent, or Firm* — Rankin, Hill & Clark LLP (57) ABSTRACT

An optical waveguide having a plurality of optical paths is formed on a substrate. A reflection mechanism is arranged above the optical waveguide. The reflection mechanism includes mirror components, each of which has an inclined reflective surface, and a mask having a plurality of openings. Laser is irradiated to the mirror components and optical path conversion inclined surfaces are formed in the plurality of optical paths at the same time by the laser reflected on the mirror components.

6 Claims, 13 Drawing Sheets

METHOD OF MANUFACTURING OPTICAL WAVEGUIDE DEVICE AND LASER PROCESSING APPARATUS

CROSS-REFERENCE TO RELATED APPLICATION

The present application claims priority from Japanese Patent Application No. 2014-264324 filed on Dec. 26, 2014, the entire content of which is incorporated herein by reference.

BACKGROUND

Technical Field

The present disclosure relates to a method of manufacturing an optical waveguide device and a laser processing apparatus.

Related Art

An optical waveguide device has been known in which an optical waveguide for guiding an optical signal is formed on a wiring board that handles an electric signal. The optical waveguide device is an optoelectronic composite board, and can transmit a high-speed signal in form of the optical signal so as to make up for a limit of a transmission speed of the electric signal.

An optical path conversion mirror is arranged at an end of the optical waveguide, and an optical element is mounted on the wiring board so that it is optically coupled with the optical path conversion mirror of the optical waveguide.

According to an example of a method of manufacturing the optical waveguide, a lower cladding layer, a core layer and an upper cladding layer are first sequentially formed on a substrate. Then, the laser is used to process the upper cladding layer and the core layer, so that a recess portion having an inclined surface of 45° relative to a light propagation direction is formed.

The light, which propagates through the core layer, is reflected in a vertical direction at an air interface of the inclined surface in the recess portion and an optical path thereof is thus converted.

[Patent Document 1] Japanese Patent Application Publication No. Hei 6-3539A
[Patent Document 2] Japanese Patent Application Publication No. 2000-117465A
[Patent Document 3] Japanese Patent Application Publication No. 2012-13819A In order to form the recess portion having the inclined surface in the optical waveguide by the laser as described above, it is necessary to obliquely set an optical axis of the laser or to obliquely arrange the optical waveguide in a laser processing apparatus. For this reason, a laser processing apparatus of a special specification is required, which increases the cost.

Also, since the one recess portion having the inclined surface is sequentially formed by one laser irradiation, the processing time is considerably prolonged in order to form the inclined surfaces in a plurality of core layers of the optical waveguide, which lowers the production efficiency.

SUMMARY

Exemplary embodiments of the invention provide a method of manufacturing optical waveguide device where an air interface of the inclined surface functions as an optical path conversion mirror and a laser processing apparatus to be used for the method, which manufactures an inclined surface for optical path conversion at low cost and with high production efficiency.

A method of manufacturing an optical waveguide device according to an exemplary embodiment comprises:

forming an optical waveguide having a plurality of optical paths on a substrate;

arranging a reflection mechanism above the optical waveguide, the reflection mechanism comprising mirror components, each of which has an inclined reflective surface, and a mask having a plurality of openings; and irradiating laser to the mirror components and forming optical path conversion inclined surfaces in the plurality of optical paths at the same time by the laser reflected on the mirror components.

A laser processing apparatus according to an exemplary embodiment comprises:

a stage;

a laser emitting unit arranged above the stage; and a reflection mechanism arranged between the stage and the laser emitting unit and comprising mirror components having inclined reflective surfaces and a mask having a plurality of openings.

According to the method of manufacturing the optical waveguide device of the invention, the reflection mechanism is arranged on the optical waveguide having the plurality of optical paths. The reflection mechanism includes the mirror components having the inclined reflective surfaces and the mask having the plurality of openings provided above or below the mirror components.

Then, the laser is irradiated to the mirror components through the plurality of openings of the mask. Thereby, the optical path conversion inclined surfaces are formed in the plurality of optical paths of the optical waveguide at the same time by the inclined laser reflected on the mirror components. Alternatively, the laser is irradiated to the optical waveguide through the mirror components and the plurality of openings of the mask. Thereby, the optical path conversion inclined surfaces are formed in the plurality of optical paths of the optical waveguide at the same time by the inclined laser reflected on the mirror components.

In this way, it is not necessary to obliquely set an optical axis of the laser in the laser processing apparatus and to obliquely arrange the optical waveguide in laser processing apparatus. The reflection mechanism having a simple structure is arranged, so that it is possible to form the optical path conversion inclined surface in each optical path of the optical waveguide. For this reason, it is not necessary to introduce a laser processing apparatus of a special specification, so that it is possible to suppress the equipment investment, which saves the cost.

Also, since the laser is irradiated to the plurality of openings of the mask, it is possible to form the optical path conversion inclined surfaces in the plurality of optical paths at the same time, so that it is possible to improve the production efficiency.

DETAILED DESCRIPTION

Hereinafter, an exemplary embodiment will be described with reference to the accompanying drawings.

Figure 9:
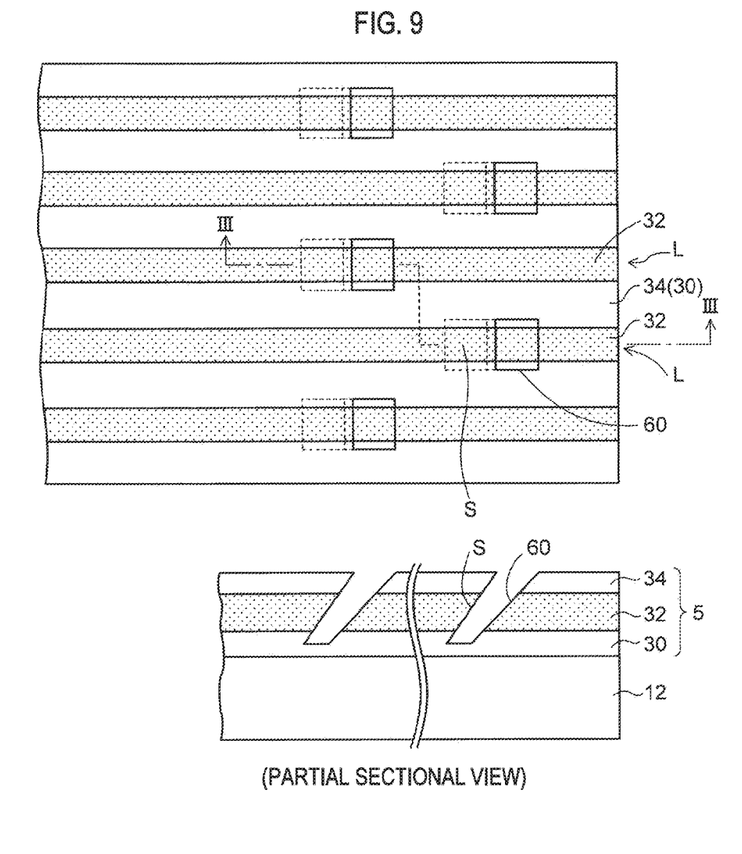
FIG. 9 is a plan view and a sectional view showing the method of manufacturing the optical waveguide device of the exemplary embodiment.
Figure 10:
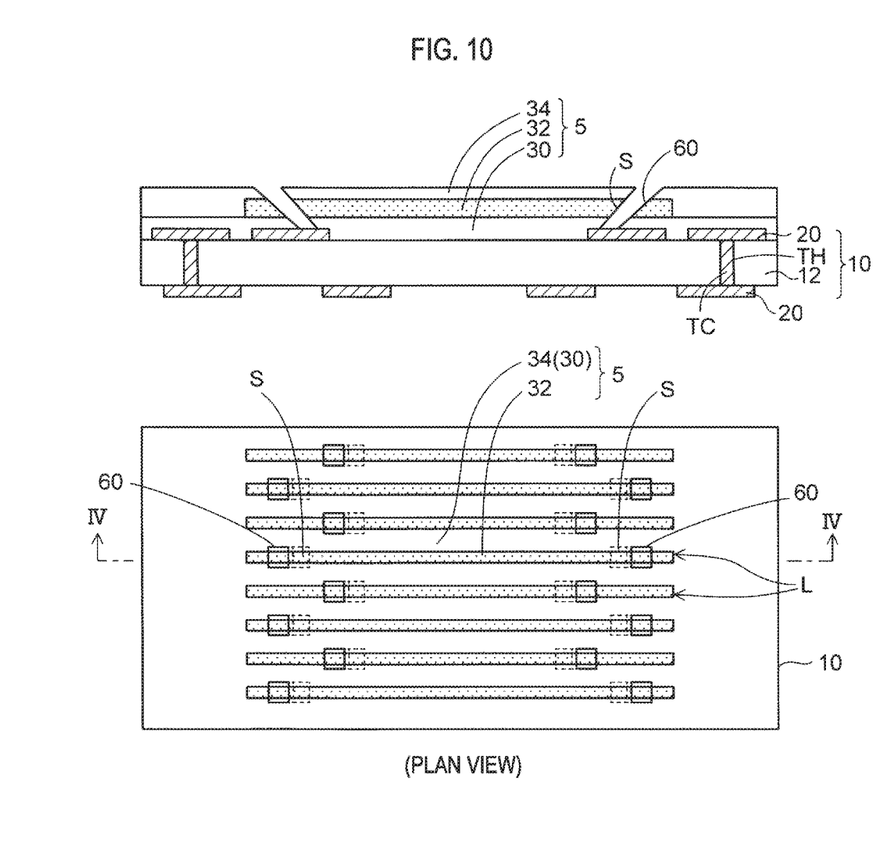
FIG. 10 is a sectional view and a plan view showing the method of manufacturing the optical waveguide device of the exemplary embodiment.
Figure 11:
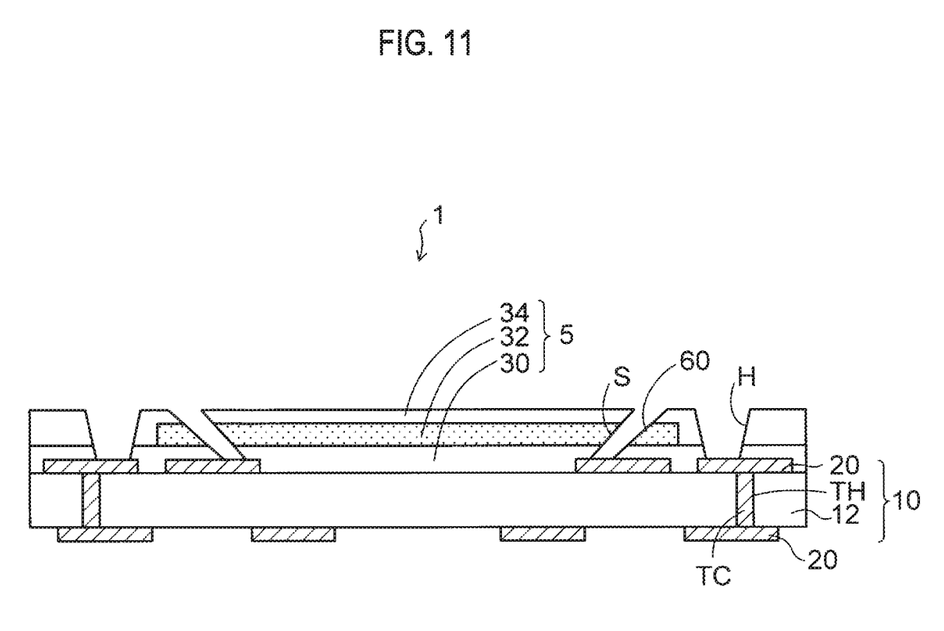
FIG. 11 is a sectional view showing the optical waveguide device of the exemplary embodiment.
Figure 12:
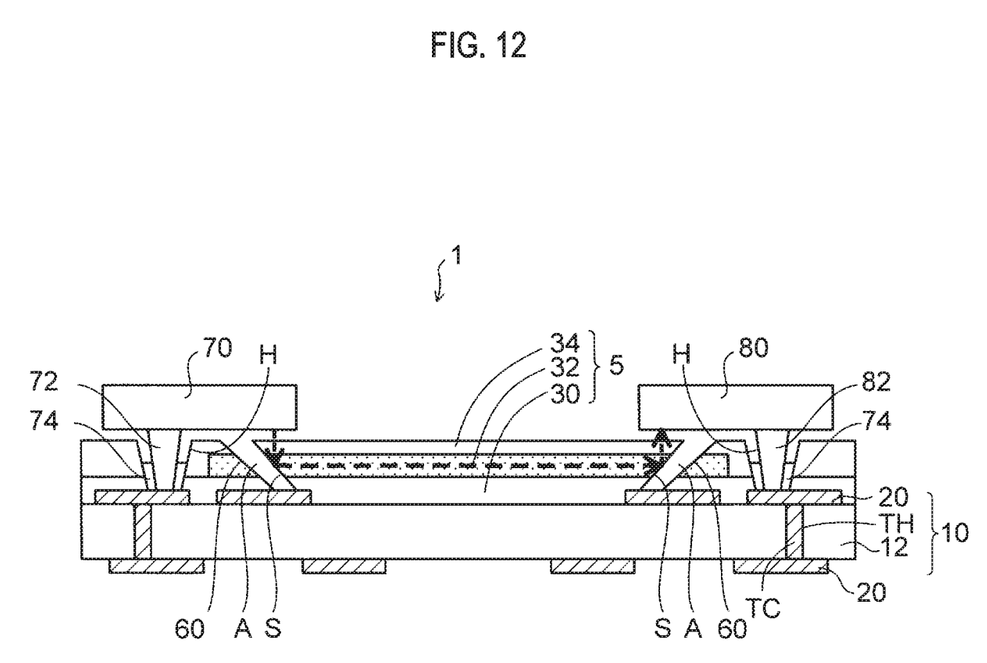
FIG. 12 is a sectional view showing a state where a light emitting element and a light receiving element are mounted on the optical waveguide device of FIG. 11.

FIGS. 1A to 10 show a method of manufacturing an optical waveguide device of an exemplary embodiment, and FIGS. 11 and 12 show an optical waveguide device of the exemplary embodiment.

Figure 1A:
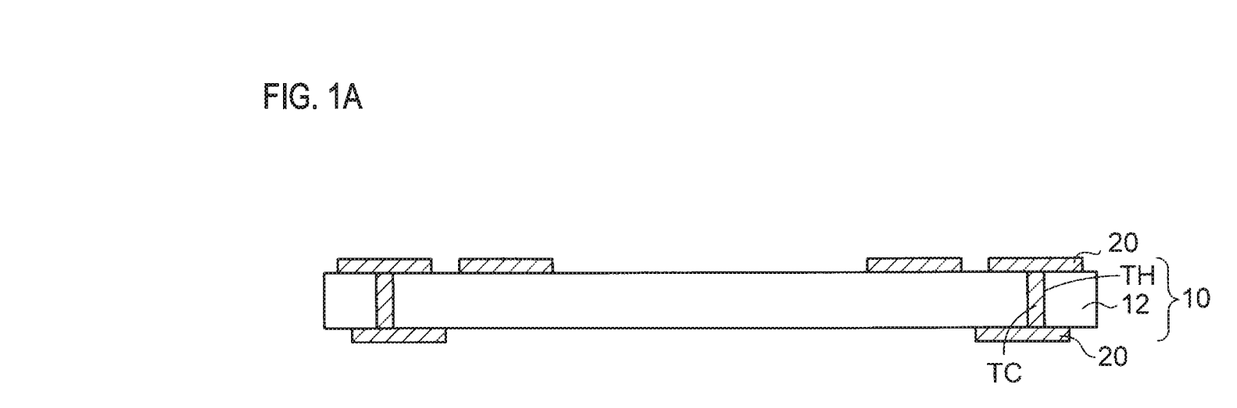
FIGS. 1A and 1B are sectional views showing a method of manufacturing an optical waveguide device of an exemplary embodiment.

According to a method of manufacturing an optical waveguide device of an exemplary embodiment, a wiring board 10 configured to handle an electric signal is first prepared, as shown in FIG. 1A. In the wiring board 10, both surfaces of an insulating substrate 12 are formed with wiring layers 20, respectively. The insulating substrate 12 is formed with through-holes TH penetrating the insulating substrate in a thickness direction, and the through-holes TH are filled with through-conductors IC. The wiring layers 20 on both surfaces are connected each other via the through-conductors TC.

On a lower surface of the insulating substrate 12, a solder resist layer (not shown) having an opening on a connection part of the wiring layer 20 may be formed.

The insulating substrate 12 is made of an insulating resin such as a glass epoxy resin, and the wiring layer 20 is made of copper. The number of the wiring layers 20 to be stacked on both surfaces of the insulating substrate 12 can be arbitrarily set.

Figure 1B:
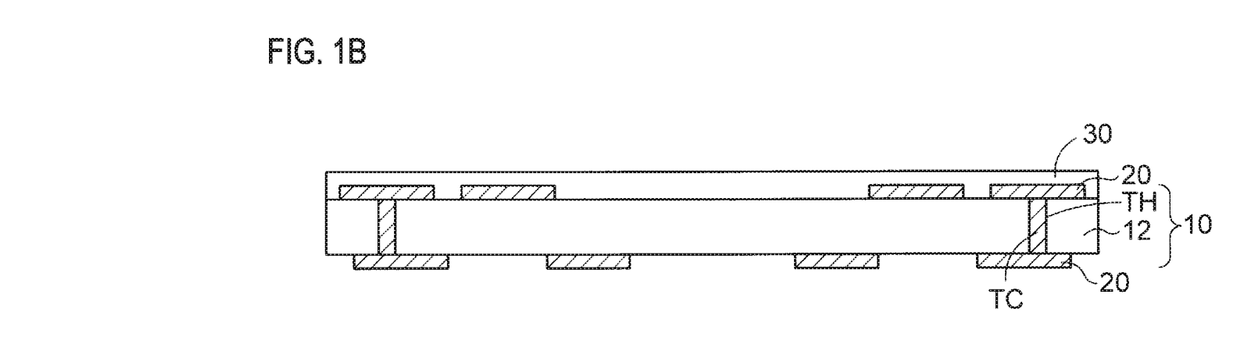

Then, as shown in FIG. 1B, a photosensitive resin layer (not shown) for obtaining a first cladding layer is formed on the wiring board 10, and exposure and developing processing is performed on the basis of the photolithography.

The photosensitive resin layer is cured by heating processing at temperatures of 100° C. to 140° C., so that a first cladding layer 30 is formed in a desired area.

As the photosensitive resin layer, a UV curable epoxy resin or the like is favorably used. As a method of forming the photosensitive resin layer, a semi-cured (B-stage) photosensitive resin sheet may be bonded or a liquid photosensitive resin may be applied.

Also in processes of forming core layers and a second cladding layer (which will be described later), the same resin is favorably used.

When it is not necessary to pattern the first cladding layer 30, the first cladding layer 30 may be formed on an entire surface of the wiring board 10 by using a non-photosensitive resin.

Figure 2:
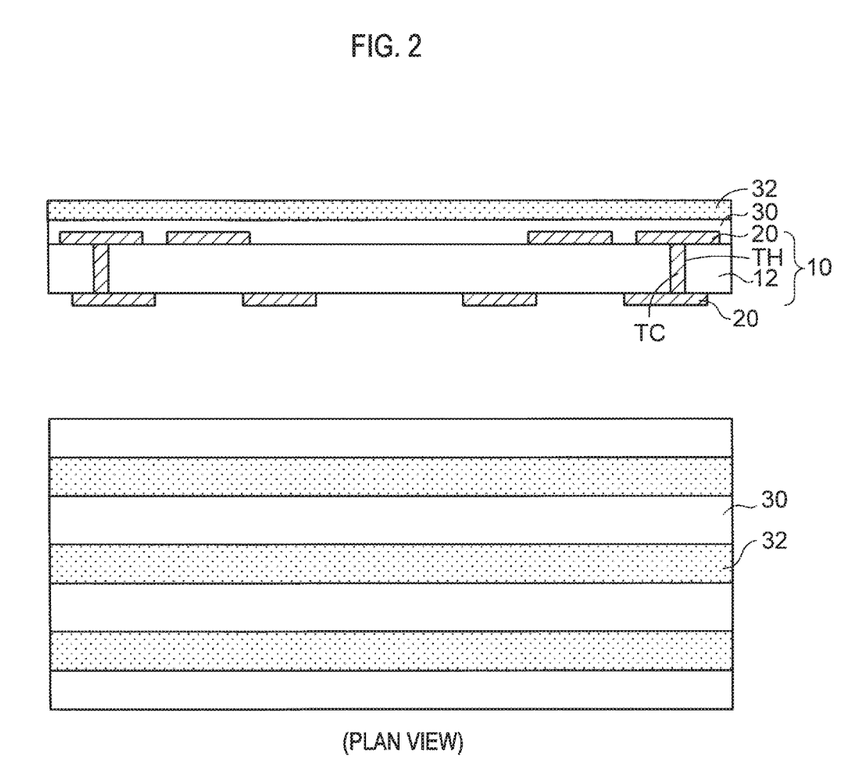
FIG. 2 is a sectional view and a plan view showing the method of manufacturing the optical waveguide device of the exemplary embodiment.

Then, as shown in FIG. 2, a photosensitive resin layer (not shown) for obtaining a core layer is formed on the first cladding layer 30. After performing the exposure and developing processing on the basis of the photolithography, the photosensitive resin layer is cured by the heating processing at temperatures of 100° C. to 140° C. Thereby, core layers 32 are formed on the first cladding layer 30 in a strip-shaped pattern.

As shown in a plan view of FIG. 2, the core layers 32 having a plurality of strip shapes extending in a horizontal direction are vertically arranged in a line on the first cladding layer 30. A refractive index of the core layer 32 is set to be greater than refractive indexes of the first cladding layer 30 and a second cladding layer (which will be described later). For example, a thickness of the core layer 32 is about 30 to 50 μm, and an arrangement pitch of the core layers 32 is about 250 μm.

Figure 3:
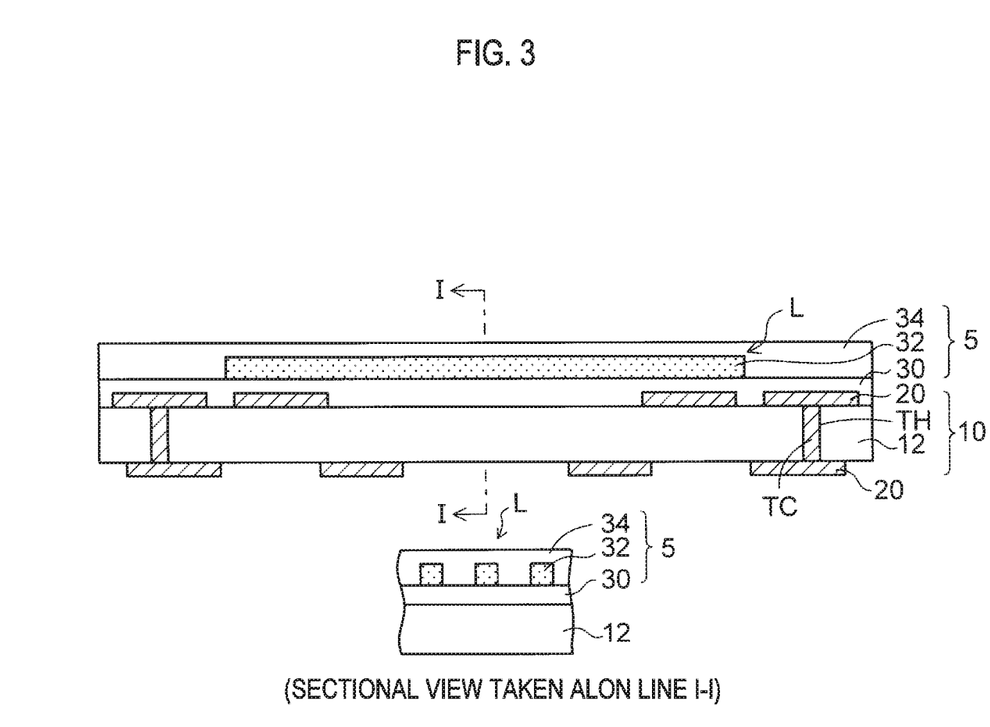
FIG. 3 is a sectional view showing the method of manufacturing the optical waveguide device of the exemplary embodiment.

Then, as shown in FIG. 3, a photosensitive resin layer (not shown) for obtaining a second cladding layer is formed on the first cladding layer 30 and the core layers 32. After performing the exposure and developing processing on the basis of the photolithography, the photosensitive resin layer is cured by the heating processing at temperatures of 100° C. to 140° C.

Thereby, a second cladding layer 34 covering the core layers 32 is formed on the first cladding layer 30.

In this way, referring to a sectional view taken along a line I-I of an upper sectional view of FIG. 3, an optical waveguide 5 where the core layers 32 are surrounded by the first cladding layer 30 and the second cladding layer 34 is formed on the insulating substrate 12. A line including the one core layer 32 of the optical waveguide 5 is formed as one optical path L.

By the above processes, the optical waveguide 5 having the plurality of optical paths L is formed on the wiring board 10.

Figure 4:
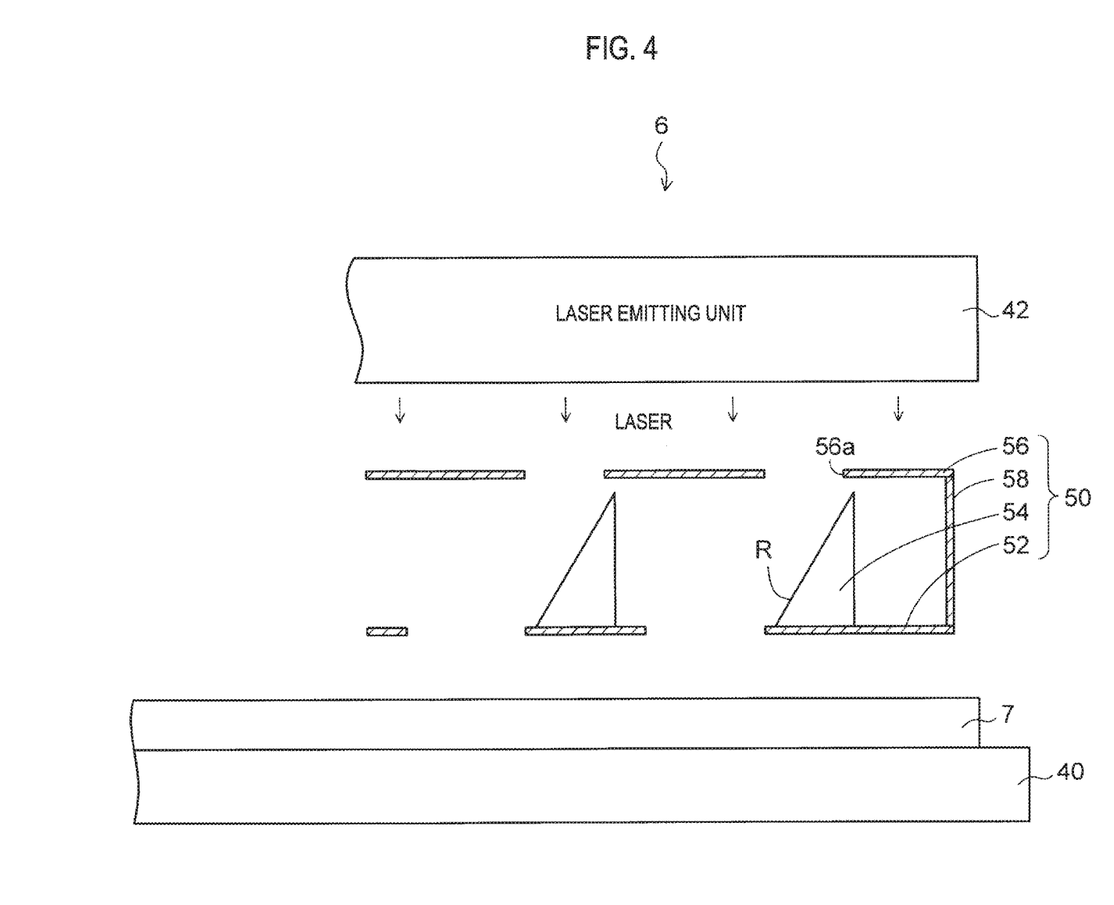
FIG. 4 is a sectional view pictorially showing a configuration of a laser processing apparatus of an exemplary embodiment.

Then, as shown in FIG. 4, a laser processing apparatus 6 of an exemplary embodiment is prepared. The laser processing apparatus 6 is used to form a recess portion having an optical path conversion inclined surface in each optical path L of the optical waveguide 5 shown in FIG. 3.

The laser processing apparatus 6 has a stage 40 for placing thereon a workpiece 7. Also, the laser processing apparatus 6 has a laser emission unit 42 for irradiating the laser to the workpiece 7 on the stage 40. Further, the laser processing apparatus 6 has a reflection mechanism 50 arranged in an area between the stage 40 and the laser emission unit 42.

Although not particularly shown, the laser emission unit 42 has a laser oscillator, a projective optical system and the like, and is configured to emit the laser from a head. As the laser, KrF excimer laser (wavelength λ=248 nm) is used, and a surface-emitting laser capable of processing a predetermined area of the workpiece 7 is adopted.

In this way, the laser is emitted from the laser emission unit 42 of the laser processing apparatus 6 over a predetermined light emission area. For example, the light emission area of the surface-emitting laser is 3 mm×2.5 mm.

Also, in the reflection mechanism 50, a plurality of mirror components 54 is fixed and arranged on a support substrate 52. The mirror component 54 has an inclined reflective surface R for reflecting the laser. In the example of FIG. 4, as the mirror component 54, a component having a triangular prism arranged in a horizontal direction is used. In addition to the example, a component in which a variety of pillar-shaped members having the same inclined reflective surface R are arranged in the horizontal direction may be used as the mirror component.

Also, in the example of FIG. 4, the two mirror components 54 are arranged. However, the number of the mirror components may be arbitrarily set in conformity to an arrangement of light emitting parts or light receiving parts of an optical element.

As a material of the mirror component 54, quartz glass having a smooth surface capable of efficiently reflecting the laser is favorably used. Since the quartz glass is not processed by the laser, it can totally reflect the laser.

Alternatively, the mirror component 54 may be made of a resin. When the resin is used, the resin is processed by the laser and thus cannot totally reflect the laser. Therefore, an inclined reflective surface of the resin member is formed with a metal mirror such as a gold layer, which is then used as the mirror component.

A mask 56 is arranged above the mirror components 54. The mask 56 has a plurality of openings 56a provided in a line above the inclined reflective surfaces R of the mirror components 54. Also, the mask 56 is supported by a side plate 58 connected to the support substrate 52.

The support substrate 52, the mask 56 and the side plate 58 are made of metal such as a stainless steel material (SUS), and may be integrally formed or may be assembled.

Figure 5:
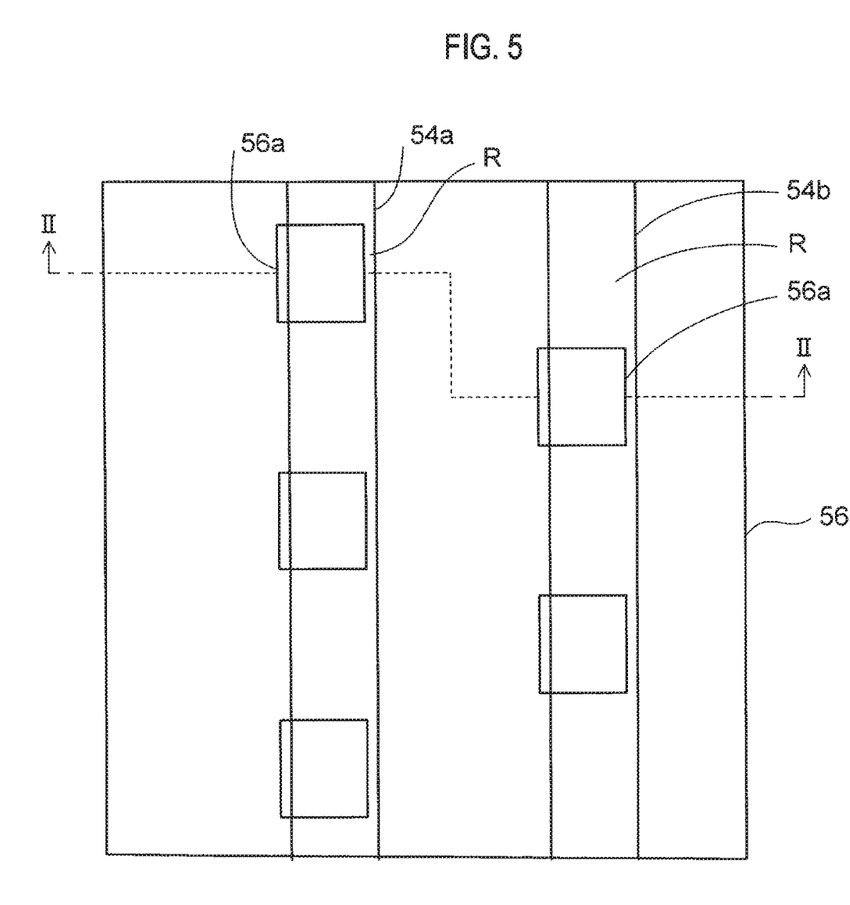
FIG. 5 is a plan view showing a reflection mechanism of the laser processing apparatus shown in FIG. 4, as seen from above.

FIG. 5 is a partial plan view showing a positional relation between the mirror components 54 of the reflection mechanism 50 and the openings 56a of the mask 56 shown in FIG. 4, as seen from above. In FIG. 5, the support substrate 52 of the reflection mechanism 50 is omitted.

As shown in FIG. 5, a first mirror component 54a arranged at an inner side and a second mirror component 54b arranged at an outer side extend in parallel. The plurality of openings 56a of the mask 56 is arranged in a line with being spaced from each other above the respective inclined reflective surfaces R of the first mirror component 54a and the second mirror component 54b.

The opening 56a of the mask 56 arranged above the first mirror component 54a and the opening 56a of the mask 56 arranged above the second mirror component 54b are arranged at offset positions at which the openings do not overlap each other in the horizontal direction.

The mirror component 54 and the mask 56 of the reflection mechanism 50 shown in FIG. 4 correspond to a section taken along a line II-II of a plan view of FIG. 5.

Figure 6:
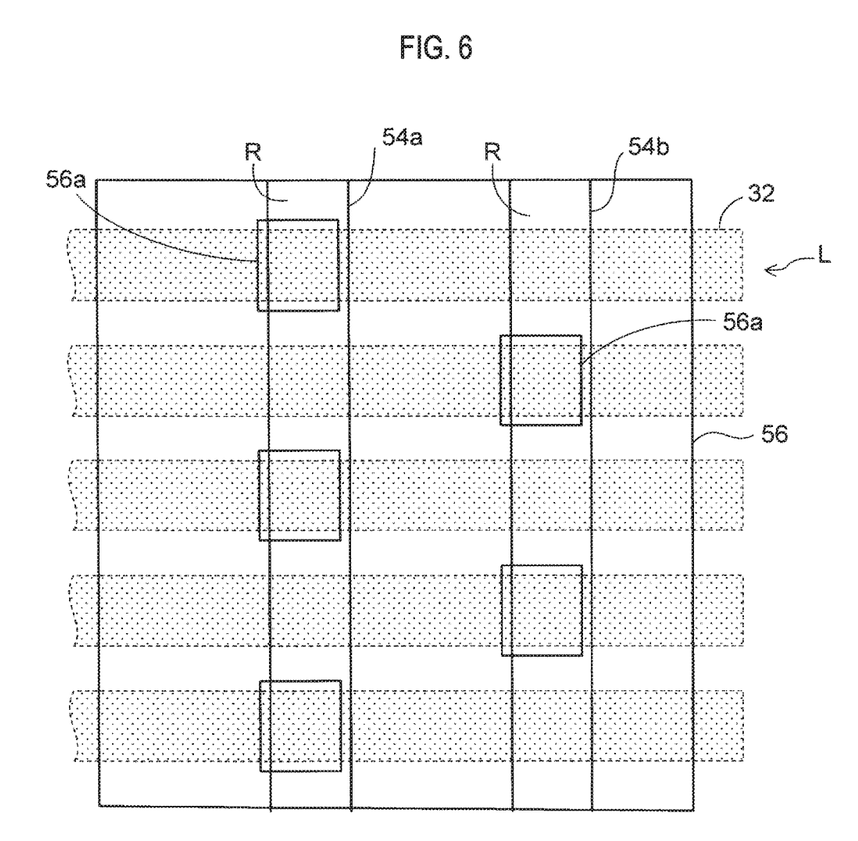
FIG. 6 is a plan view showing the reflection mechanism of FIG. 5 arranged on an optical waveguide.

As shown in the sectional view of FIG. 3, in the optical waveguide 5, the plurality of core layers 32 is arranged in a line, so that the plurality of optical paths L is formed. FIG. 6 pictorially shows a state where the reflection mechanism 50 of FIG. 5 is arranged above the plurality of core layers 32 (the optical paths L), in FIG. 6, only the core layers 32 of the optical waveguide 5 are shown with the broken line and the first and second cladding layers 30, 34 are omitted.

As shown in FIG. 6, the respective openings 56a of the mask 56 above the first mirror component 54a arranged at the inner side and the respective openings 56a of the mask 56 above the second mirror component 54b arranged at the outer side are alternately arranged above respective one end portions of the plurality of core layers 32 (the optical paths L).

Figure 7:
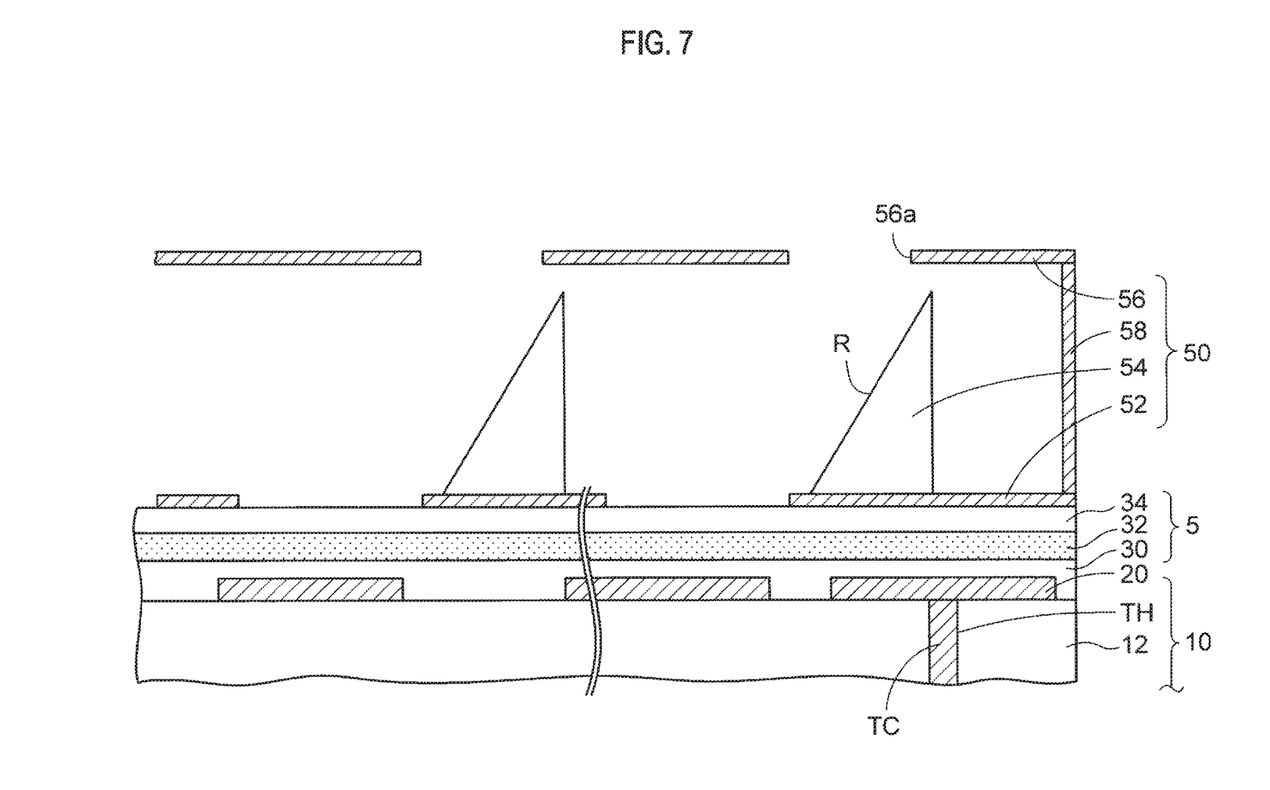
FIG. 7 is a sectional view showing the method of manufacturing the optical waveguide device of the exemplary embodiment.

FIG. 7 is a partially enlarged view showing a state where the reflection mechanism 50 of the laser processing apparatus 6 shown in FIG. 4 is arranged on a right end portion of the optical waveguide 5 shown in FIG. 3. Also, regarding the core layer 32 of the optical waveguide 5, the two adjacent core layers are pictorially showed with being separated into one.

As shown in FIG. 7, the openings 56a of the mask 56 are respectively positioned above the respective end portions of the plurality of core layers 32 and the reflection mechanism 50 shown in FIG. 4 is arranged on the optical waveguide 5, as described in FIG. 6.

When forming the core layers 32, a positioning mark (not shown) formed at the same time, and when forming the second cladding layer 34, the positioning mark is exposed by opening an area above the positioning mark.

Based on image recognition of the positioning mark, the openings 56a of the mask 56 are positioned with respect to the respective core layers 32 of the optical waveguide 5.

When arranging the reflection mechanism 50 on the optical waveguide 5, the reflection mechanism 50 may be temporarily fixed to the optical waveguide 5 by an adhesive, for example.

Figure 8:
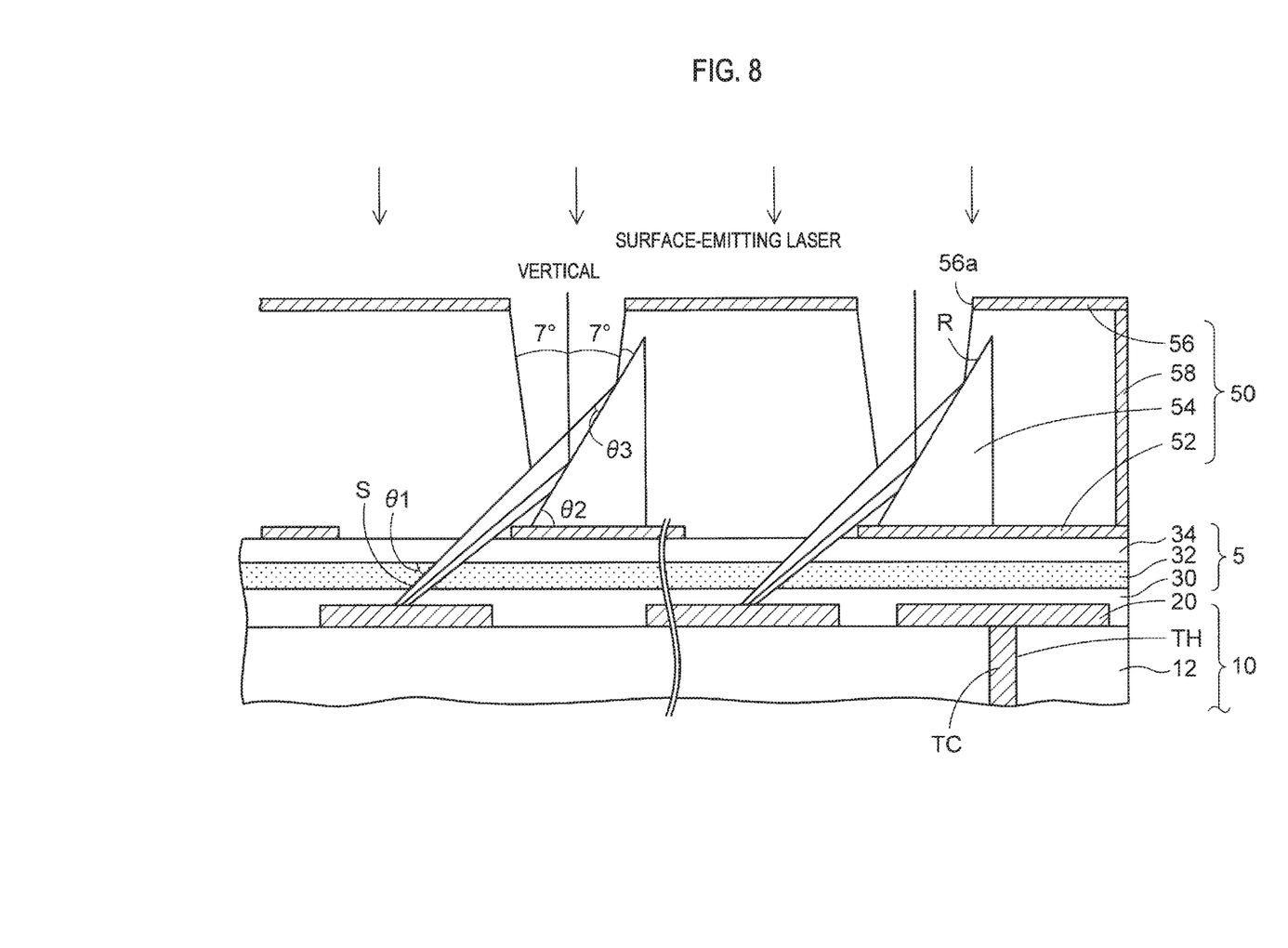
FIG. 8 is a sectional view showing the method of manufacturing the optical waveguide device of the exemplary embodiment.

Then, as shown in FIG. 8, the laser is emitted from the laser emission unit 42 of the laser processing apparatus 6 shown in FIG. 4. At this time, the laser is irradiated over the entire reflection mechanism 50, as the surface-emitting laser. The laser reaches the inclined reflective surfaces R of the mirror components 54 of the reflection mechanism 50 through the plurality of openings 56a of the mask 56.

The laser is totally reflected on the inclined reflective surfaces R of the mirror components 54 and is obliquely incident to the surface of the second cladding layer 34 of the optical waveguide 5. Thereby, the second cladding layer 34, the core layers 32 and the first cladding layer 30 are obliquely processed by the inclined laser reflected on the mirror components 54, so that recess portions 60, each of which has an optical path conversion inclined surface S are formed.

Since the optical path conversion inclined surface S of the recess portion 60 is used as an optical path conversion mirror, an inclined angle $\theta 1$ of the optical path conversion inclined surface S is favorably adjusted to be 45° with respect to the light propagation direction.

Like the example of FIG. 8, when the laser is inwardly inclined by 7° with respect to a central axis and has a tapered angle, a reflection angle $\theta 3$ of the laser on the mirror component 54 is 19° (=(45°−7°)/2). Therefore, when an inclined angle $\theta 2$ of the inclined reflective surface R of the mirror component 54 is set to 64°, the inclined angle $\theta 1$ of the optical path conversion inclined surface S of the optical waveguide 5 is 45°.

It is possible to finely adjust the inclined angle of the optical path conversion inclined surface S of the recess portion 60 formed in the optical waveguide 5 by changing the tapered angle of the laser and the inclined angle $\theta 2$ of the inclined reflective surface R of the mirror component 54.

Thereby, as shown in a plan view of FIG. 9, the second cladding layer 34, the core layers 32 and the first cladding layer 30 of the plurality of optical paths L are processed by the laser, so that the recess portions 60 having the optical path conversion inclined surfaces S are respectively formed. A partial sectional view of FIG. 9 corresponds to a section taken along a line III-III of the plan view of FIG. 9.

The recess portion 60 is formed in a range from an upper surface of the second cladding layer 34 to at least a part of the thickness of the first cladding layer 30 through the core layer 32. The optical path conversion inclined surface S in the recess portion 60 is inclined from an outer side of the optical path L towards an inner side, and an air interface of the optical path conversion inclined surface S functions as an optical path conversion mirror.

It is possible to adjust an area of an opening end of the recess portion 60 formed in each optical path L by changing an area of the opening 56a of the mask 56 of the reflection mechanism 50.

In the reflection mechanism 50 described in FIG. 4, the support substrate 52 is opened in most areas of the peripheries of the mirror components 54. In addition to this shape, the support substrate 52 may be configured to function as the mask by forming openings having the same areas as the opening ends of the recess portions 60 formed in the respective optical paths L.

Figure 13:
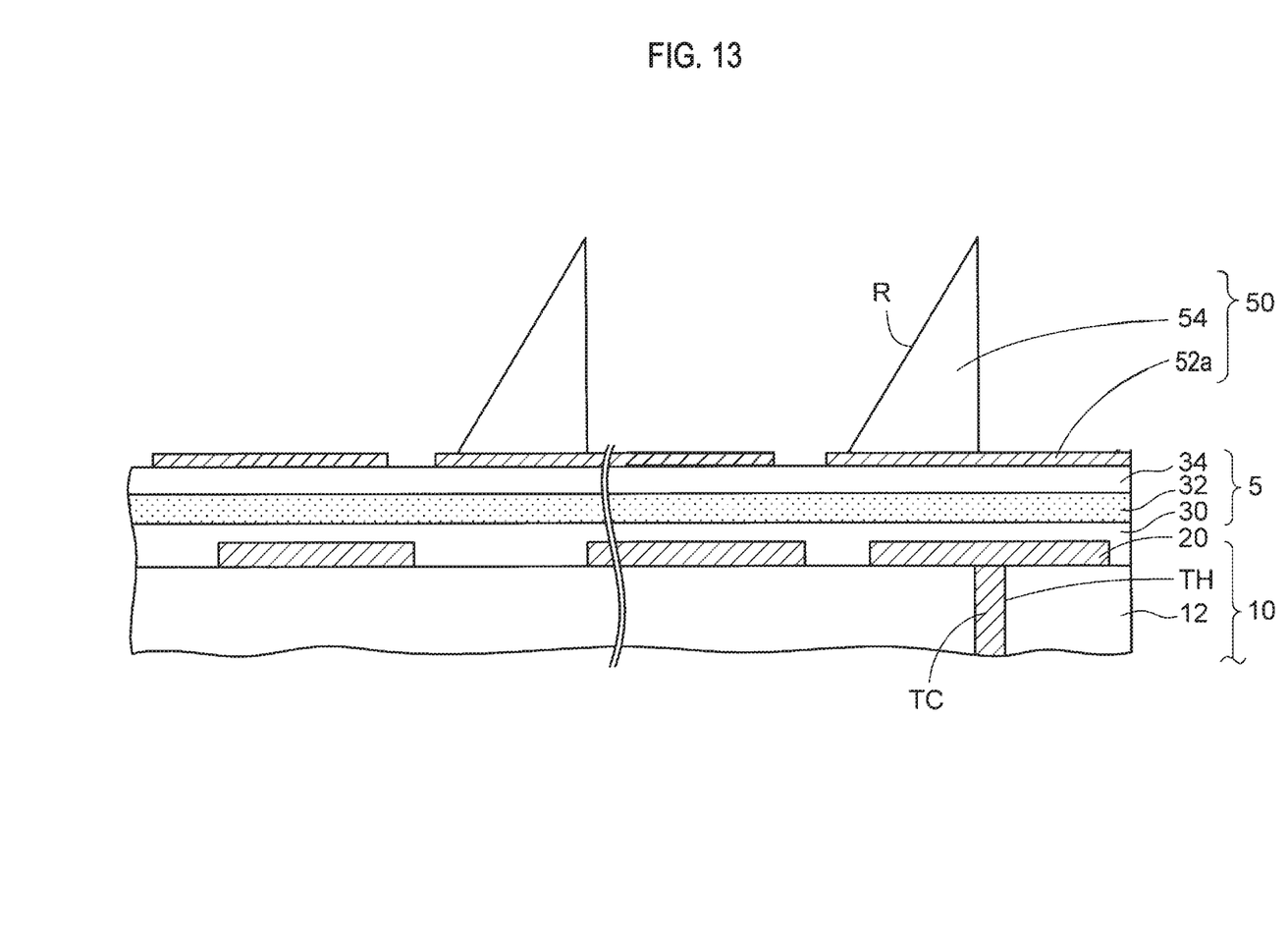
FIG. 13 is a sectional view pictorially showing a modified example of the reflection mechanism in FIG. 7.

In this case, the laser reflected on the mirror component 54 through the opening 56a of the mask 56 of the reflection mechanism 6 is positioned through the opening of the support substrate 52, so that the recess portion 60 is formed in each optical path L. In this way, when the support substrate 52 is configured to function as the mask, the openings 56a of the mask 56 may be opened into an elongated shape above the mirror components 54. Alternatively, as shown in FIG. 13, only a support substrate 52a configured to function as the mask may be provided without providing the mask 56.

Since the laser processing apparatus 6 of the exemplary embodiment is configured to incline the vertically emitted laser on the inclined reflective surface R of the mirror component 54 by 45°, it is not necessary to obliquely set an optical axis of the laser in the laser emission unit 42 and to obliquely place the optical waveguide 5 on the stage 40.

The reflection mechanism 50 having a simple structure is arranged, so that it is possible to easily form the recess portion 60 having the optical path conversion inclined surface S in each optical path L of the optical waveguide 5. For this reason, it is not necessary to introduce a laser processing apparatus of a special specification, so that it is possible to suppress the equipment investment, which saves the cost.

Also, the laser is irradiated to the plurality of openings 56a of the mask 56 by the surface-emitting laser. For this reason, since it is possible to form the recess portions 60 having the optical path conversion inclined surfaces S in the plurality of optical paths L of the optical waveguide 5 at the same time, it is possible to improve the production efficiency. Thereby, it is possible to manufacture the optical waveguide device at a high yield and with a short lead time.

FIG. 10 shows a shape where the recess portions 60 having the optical path conversion inclined surfaces S are formed on both end portions of the respective optical paths L of the optical waveguide 5 shown in FIG. 3. A sectional view of FIG. 10 corresponds to a section taken along a line IV-IV of a plan view of FIG. 10. In the plan view of FIG. 10, only the optical paths L of the optical waveguide 5 and the recess portions 60 are shown, and the wiring layer 20 and the like of the wiring board 10 are omitted.

As shown in FIG. 10, the recess portion 60 having the optical path conversion inclined surface S is also formed at an opposite end portion of each optical path L of the optical waveguide 5. Also at the opposite end portion of each optical path L of the optical waveguide 5, the optical path conversion inclined surface S is formed to be inclined from the outer side of the optical path L towards the inner side, and the air interface of the optical path conversion inclined surface S functions as the optical path conversion mirror.

Also, at both end portions of the plurality of optical paths L, the optical path conversion inclined surfaces S are alternately formed at the outer and inner sides, so that they are arranged into a zigzag shape of two lines. Thereby, it is possible to construct an optical waveguide device having optical paths L of two different systems.

Subsequently, as shown in FIG. 11, the first cladding layer 30 and the second cladding layer 34 in the outer areas of the core layers 32 are processed by the laser, so that connection holes H reaching the connection parts of the wiring layer 20 of the wiring board 10 are formed.

In the meantime, when forming the first cladding layer 30 and the second cladding layer 34, the connection holes H may be formed by performing the patterning on the basis of the photolithography so that the respective openings overlap and communicate with each other.

By the above processes, an optical waveguide device 1 of the exemplary embodiment is obtained, as shown in FIG. 11.

Subsequently, an aspect where an optical element is connected to the optical waveguide device 1 of the exemplary embodiment is described. In this exemplary embodiment, alight emitting element and a light receiving element are mounted as the optical element.

As shown in FIG. 12, a light emitting element 70 is first optically coupled and mounted to the optical path conversion inclined surface S at one end-side (left side) of the core layer 32 of the optical waveguide 5.

A bump electrode 72 of the light emitting element 70 is arranged in the connection hole H and is connected to the connection part of the wiring layer 20 of the wiring board 10 by a soldering 74. As the light emitting element, the surface-emitting laser (VCSEL: Vertical Cavity Surface Emitting Laser) is favorably used.

The light emitting element 70 has a plurality of light emitting parts not shown) on a lower surface thereof, and each light emitting part is optically coupled to each optical path conversion inclined surface S of the optical waveguide 5.

Also, a light receiving element 80 is optically coupled and mounted to the optical path conversion inclined surface S at the other end-side (right side) of the core layer 32 of the optical waveguide 5.

A bump electrode 82 of the light receiving element 80 is arranged in the connection hole H and is connected to the connection part of the wiring layer 20 of the wiring board 10 by a soldering 74. As the light receiving element, a photo diode is favorably used.

The light receiving element 80 has a plurality of light receiving parts (not shown) on a lower surface thereof, and each light receiving part of the light receiving element 80 is optically coupled to each optical path conversion inclined surface S of the optical waveguide 5.

In the optical waveguide device 1 of the exemplary embodiment, as shown with an arrow path of FIG. 12, an electric signal output from a driver element (not shown) is supplied to the light emitting element 70, and the light is downwardly emitted from the light emitting element 70.

The light emitted from the light emitting element 70 penetrates the second cladding layer 34 and the core layer 32 and reaches the optical path conversion inclined surface S. Also, the light is reflected at the air interface between the optical path conversion inclined surface S and a space A, is 90°-changed as regards the optical path thereof and is then incident to the core layer 32.

The light incident to the core layer 32 propagates with being repeatedly totally reflected in the core layer 32, and reaches the optical path conversion inclined surface S of the other end-side. Then, the light is reflected at the air interface of the optical path conversion inclined surface S of the other end-side, is 90°-changed as regards the optical path thereof, penetrates the first cladding layer 30 and is then incident to the light receiving element 80.

The light receiving element 80 converts the optical signal into an electric signal, and the electric signal is supplied to an amplifier element (not shown).

In an alternative shape, the two light emitting elements may be independently optically coupled and mounted to the optical path conversion inclined surfaces S at the outer and inner sides of the optical path L. In this case, the two light receiving elements are independently optically coupled and mounted to the optical path conversion inclined surfaces S at the outer and inner sides of the optical path L of the opposite side.

As described above, according to the method of manufacturing the optical waveguide device 1 of the exemplary embodiment, it is possible to form the optical path conversion inclined surfaces S in the plurality of optical paths L. Therefore, it is possible to manufacture a multi-channel optical waveguide to which a high-performance optical element is to be mounted at low cost and with a short lead time.

What is claimed is:

1. A method of manufacturing an optical waveguide device, the method comprising:

forming an optical waveguide having a plurality of optical paths on a substrate;

arranging a reflection mechanism above the optical waveguide, the reflection mechanism comprising mirror components and a mask, each of the mirror components having an inclined reflective surface, the mask having a plurality of openings, and the mask being disposed above the mirror components; and irradiating laser to the mirror components through the plurality of openings of the mask of the reflection mechanism, and forming optical path conversion inclined surfaces in the plurality of optical paths at a same time by the laser reflected on the mirror components.

2. The method according to claim 1, wherein the mirror components are formed of quartz glass.

3. The method according to claim 1, wherein each of the mirror components is a component in which a pillar-shaped member having the inclined reflective surface is arranged in a horizontal direction.

4. The method according to claim 1, wherein the optical path conversion inclined surfaces are each inclined from an outer side of the optical path towards an inner side thereof, and an air interface of each of the optical path conversion inclined surfaces functions as an optical path conversion mirror.

5. The method according to claim 4, further comprising:

mounting an optical element, which is configured to optically couple with the optical path conversion inclined surfaces, after the forming the optical path conversion inclined surfaces in the plurality of optical paths.

6. A method of manufacturing an optical waveguide device, the method comprising:

forming an optical waveguide having a plurality of optical paths on a substrate;

arranging a reflection mechanism above the optical waveguide, the reflection mechanism comprising mirror components and a mask, each of the mirror components having an inclined reflective surface, the mask having a plurality of openings, and the mask being disposed below the mirror components; and irradiating laser to the mirror components, and forming optical path conversion inclined surfaces in the plurality of optical paths at a same time by the laser reflected on the mirror components and passing through the plurality of openings of the mask of the reflection mechanism.

* * * * *